United States Patent
Lee et al.

(10) Patent No.: US 9,629,178 B2
(45) Date of Patent: Apr. 18, 2017

(54) METHOD AND APPARATUS FOR TRANSMITTING DEVICE-TO-DEVICE RELATED MESSAGE IN WIRELESS COMMUNICATION SYSTEM

(71) Applicant: LG ELECTRONICS INC., Seoul (KR)

(72) Inventors: Youngdae Lee, Seoul (KR); Sungjun Park, Seoul (KR); Seungjune Yi, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/412,974

(22) PCT Filed: Jul. 22, 2013

(86) PCT No.: PCT/KR2013/006536
§ 371 (c)(1),
(2) Date: Jan. 5, 2015

(87) PCT Pub. No.: WO2014/014326
PCT Pub. Date: Jan. 23, 2014

(65) Prior Publication Data
US 2015/0208452 A1 Jul. 23, 2015

Related U.S. Application Data

(60) Provisional application No. 61/673,739, filed on Jul. 20, 2012.

(51) Int. Cl.
*H04W 76/02* (2009.01)
*H04W 72/14* (2009.01)
(Continued)

(52) U.S. Cl.
CPC ............ *H04W 72/14* (2013.01); *H04W 8/005* (2013.01); *H04W 8/14* (2013.01); *H04W 8/24* (2013.01);
(Continued)

(58) Field of Classification Search
CPC ............. H04W 76/023; H04W 72/042; H04W 72/1284; H04W 28/0278; H04W 4/005;
(Continued)

(56) References Cited

U.S. PATENT DOCUMENTS

2007/0097926 A1 5/2007 Liu et al.
2007/0258402 A1 11/2007 Nakamata et al.
(Continued)

FOREIGN PATENT DOCUMENTS

CN 102365897 2/2012
EP 2773129 A1 9/2014
(Continued)

OTHER PUBLICATIONS

Fodor, et al., "Design Aspects of Network Assisted Device-to-Device Communications," IEEE Communications Magazine, Mar. 2012, pp. 170-177.
(Continued)

*Primary Examiner* — Hirdepal Singh
(74) *Attorney, Agent, or Firm* — Lee Hong Degerman Kang Waimey

(57) ABSTRACT

A method and apparatus for establishing a device-to-device (D2D) connection in a wireless communication system is provided. A first mobile device transmits a D2D related message including an identity of a second mobile device, which is connected with the first mobile device, to a network. Or, a first mobile device receives a D2D related
(Continued)

message including an identity of a second mobile device, which is connected with the first mobile device, from a network.

14 Claims, 10 Drawing Sheets

(51) Int. Cl.

| | |
|---|---|
| *H04W 76/04* | (2009.01) |
| *H04W 36/00* | (2009.01) |
| *H04W 8/00* | (2009.01) |
| *H04W 60/04* | (2009.01) |
| *H04W 68/02* | (2009.01) |
| *H04W 8/14* | (2009.01) |
| *H04W 8/24* | (2009.01) |
| *H04W 24/08* | (2009.01) |
| *H04W 72/04* | (2009.01) |
| *H04W 88/06* | (2009.01) |
| *H04W 24/10* | (2009.01) |
| *H04W 92/18* | (2009.01) |

(52) U.S. Cl.
CPC ....... *H04W 24/08* (2013.01); *H04W 36/0061* (2013.01); *H04W 60/04* (2013.01); *H04W 68/02* (2013.01); *H04W 72/042* (2013.01); *H04W 76/023* (2013.01); *H04W 76/027* (2013.01); *H04W 76/043* (2013.01); *H04W 76/046* (2013.01); *H04W 76/048* (2013.01); *H04W 24/10* (2013.01); *H04W 76/021* (2013.01); *H04W 88/06* (2013.01); *H04W 92/18* (2013.01)

(58) Field of Classification Search
CPC ..... H04W 16/14; H04W 24/10; H04W 28/08; H04W 72/04; H04W 8/005; H04W 92/18; H04W 4/008; H04W 72/0406; H04W 72/1278; H04W 8/24; H04W 72/14; H04W 88/06; H04W 24/08; H04W 36/0061; H04W 60/04; H04W 68/02; H04W 76/021

See application file for complete search history.

(56) References Cited

U.S. PATENT DOCUMENTS

| | | | |
|---|---|---|---|
| 2009/0316633 A1 | 12/2009 | Kato et al. | |
| 2010/0261469 A1 | 10/2010 | Ribeiro et al. | |
| 2010/0279695 A1 | 11/2010 | Amirijoo et al. | |
| 2011/0261747 A1 | 10/2011 | Wang et al. | |
| 2011/0317569 A1 | 12/2011 | Kneckt et al. | |
| 2012/0020231 A1 | 1/2012 | Chen et al. | |
| 2012/0083283 A1 | 4/2012 | Phan et al. | |
| 2012/0099452 A1* | 4/2012 | Dai ................... | H04W 72/1221 370/252 |
| 2012/0163235 A1 | 6/2012 | Ho et al. | |
| 2012/0184306 A1 | 7/2012 | Zou et al. | |
| 2013/0064103 A1* | 3/2013 | Koskela ............ | H04W 72/1284 370/252 |
| 2013/0107722 A1* | 5/2013 | Huang ................. | H04W 28/12 370/241 |
| 2013/0107782 A1* | 5/2013 | Anas ..................... | H04W 52/02 370/311 |
| 2013/0156000 A1* | 6/2013 | Hwang ............. | H04W 72/0453 370/330 |
| 2013/0170387 A1 | 7/2013 | Wang et al. | |
| 2013/0208641 A1 | 8/2013 | Baghel et al. | |
| 2013/0258996 A1* | 10/2013 | Jung ................. | H04W 72/1284 370/330 |
| 2013/0272294 A1 | 10/2013 | Mildh et al. | |
| 2013/0322277 A1 | 12/2013 | Vanganuru et al. | |
| 2013/0322413 A1* | 12/2013 | Pelletier ............ | H04W 72/1289 370/336 |
| 2013/0329711 A1 | 12/2013 | Seo et al. | |
| 2014/0036718 A1* | 2/2014 | Gao .................... | H04W 72/121 370/254 |
| 2014/0200016 A1 | 7/2014 | Siomina et al. | |
| 2014/0335875 A1 | 11/2014 | Li et al. | |
| 2015/0071212 A1 | 3/2015 | Kim et al. | |
| 2015/0156757 A1* | 6/2015 | Kalhan ................. | H04L 1/1607 370/330 |
| 2015/0163689 A1 | 6/2015 | Lee et al. | |
| 2015/0304969 A1* | 10/2015 | Morita ................ | H04W 52/367 455/522 |

FOREIGN PATENT DOCUMENTS

| | | |
|---|---|---|
| JP | 2012-119827 | 6/2012 |
| JP | 2014504814 A | 2/2014 |
| WO | 2011109027 A1 | 9/2011 |
| WO | 2011/123549 | 10/2011 |
| WO | 2012/088470 | 6/2012 |
| WO | 2012091420 | 7/2012 |
| WO | 2012/144320 | 10/2012 |
| WO | 2013157906 A1 | 10/2013 |
| WO | 2013181515 A2 | 12/2013 |
| WO | 2013191353 A1 | 12/2013 |

OTHER PUBLICATIONS

PCT International Application No. PCT/KR2013/006536, Written Opinion of the International Searching Authority dated Oct. 24, 2013, 1 page.
United States Patent and Trademark Office U.S. Appl. No. 14/409,392, Office Action dated Jun. 16, 2016, 14 pages.
European Patent Office Application No. 13819627.4, Search Report dated Jun. 13, 2016, 9 pages.
European Patent Office Application No. 13820017.5, Search Report dated Feb. 25, 2016, 8 pages.
Patrick Marsch et al., "Future Mobile Communication Networks: Challenges in the Design and Operation", IEEE Vehiculartechnologymagazine, XP055183073, Jan. 27, 2012, 8 pages.
United States Patent and Trademark Office U.S. Appl. No. 14/413,662, Notice of Allowance dated Aug. 12, 2016, 8 pages.
Intel Corporation, "Suggested D2D Terminologies (Operator Managed, Operator Assisted, Operator Free)", 3GPP TSG-SA WG1 Meeting #57, S1-120059, Feb. 6, 2012, 3 pages.
The State Intellectual Property Office of the People's Republic of China Application Serial No. 201380041459.X, Office Action dated Jan. 4, 2017, 8 pages.

* cited by examiner

METHOD AND APPARATUS FOR TRANSMITTING DEVICE-TO-DEVICE RELATED MESSAGE IN WIRELESS COMMUNICATION SYSTEM

CROSS-REFERENCE TO RELATED APPLICATIONS

This application is the National Stage filing under 35 U.S.C. 371 of International Application No. PCT/KR2013/006536, filed on Jul. 22, 2013, which claims the benefit of U.S. Provisional Application Ser. No. 61/673,739, filed on Jul. 20, 2012, the contents of which are all hereby incorporated by reference herein in their entirety.

BACKGROUND OF THE INVENTION

Field of the Invention

The present invention relates to wireless communications, and more particularly, to a method and apparatus for transmitting a device-to-device (D2D) related message in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the 3rd generation partnership project (3GPP) that standardized UMTS.

With the advent of a ubiquitous environment, there is a rapid increase in a demand for receiving a seamless service anytime anywhere by using equipments. In order to satisfy such a demand, a device-to-device (D2D) connection technique may be introduced in a wireless communication system. The D2D connection technique refers to a technique for transmitting and receiving data not via a base station (BS) since devices such as a user equipment (UE) or the like are connected to each other. That is, one device can communicate with another device via the BS, and can directly communicate with another device not via the BS. By using the D2D connection technique, such an effect as low power consumption, throughput enhancement, etc., can be obtained.

How a network and UEs should operate for D2D connection should be specified.

SUMMARY OF THE INVENTION

The present invention provides a method and apparatus for transmitting a device-to-device (D2D) related message in a wireless communication system. The present invention provides a method for fetching context of a neighbor device from a network for a D2D connection. The present invention also provides a method for transmitting/receiving, by a first mobile device, the D2D related message including an identity of a second mobile device to/from the network.

In an aspect, a method for transmitting, by a first mobile device, a device-to-device (D2D) related message in a wireless communication system is provided. The method includes transmitting a D2D related message including an identity of a second mobile device, which is connected with the first mobile device, to a network.

The method may further include receiving the identity of the second mobile device from the second mobile device.

The identity of the second mobile device may be one of an international mobile subscriber identity (IMSI), a system architecture evolution (SAE) temporary mobile subscriber identity (S-TMSI), a slave user equipment (S-UE) cell radio network temporary identity (S-CRNTI), and a new UE identity allocated to the second mobile device.

The method may further include receiving information on a radio communication between the first mobile device and the second mobile device from the network, and transmitting the received information to the second mobile device.

The information may include another identity of the second mobile device, which is allocated by the network and will be used for the radio communication between the first mobile device and the second mobile device.

The information may include at least one of security parameters used for activating security of the radio communication between the first mobile device and the second mobile device, capability of the second mobile device, quality of service (QoS) parameters used for configuring radio bearers between the first mobile device and the second mobile device, radio parameters used for configuring the radio bearers between the first mobile device and the second mobile device, and radio resources allocated to either the first mobile device or the second mobile device for the radio communication between the first mobile device and the second mobile device.

The information may include at least one of decision on whether establishment of connection between the first mobile device and the second mobile device should be rejected or not, and decision on release of the connection between the first mobile device and the second mobile device.

The information may include information related to one or more neighboring cells.

The method may further include receiving, from the second mobile device, a channel quality of radio interface between the first mobile device and the second mobile device, and transmitting the received channel quality to the network. The channel quality has been measured by the second mobile device.

The method may further include receiving, from the second mobile device, at least one of a buffer status report (BSR) and a power headroom report (PHR) of the second mobile device, and transmitting the received at least one of PSR and PHR to the network.

The method may further include receiving, from the second mobile device, a service type of connection between the first mobile device and the second mobile device, and transmitting the received service type to the network.

In another aspect, a method for receiving, by a first mobile device, a device-to-device (D2D) related message in a wireless communication system is provided. The method includes receiving a D2D related message including an identity of a second mobile device, which is connected with the first mobile device, from a network.

D2D connection can be established efficiently between mobile devices.

DESCRIPTION OF EXEMPLARY
EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3$^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
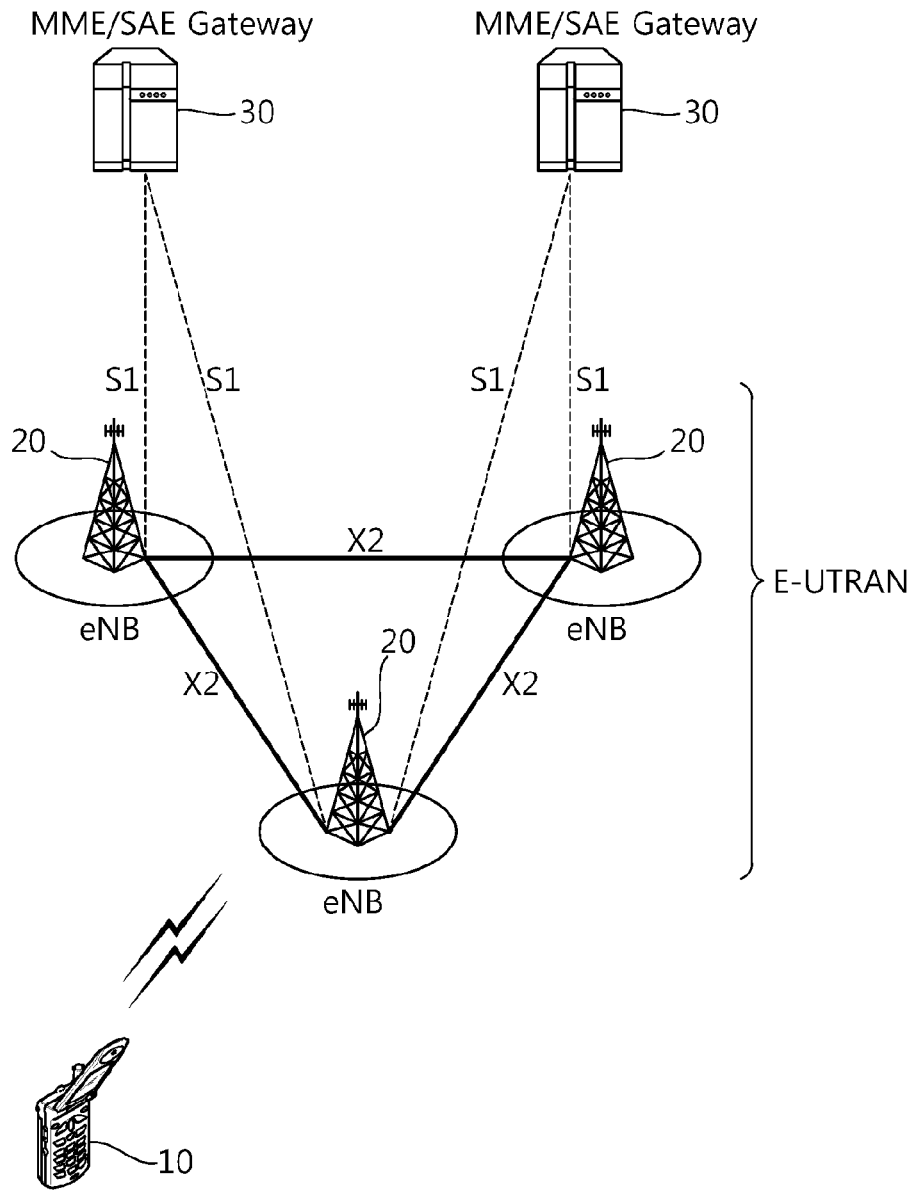
FIG. 1 shows a structure of a wireless communication system.

FIG. 1 shows a structure of a wireless communication system.

The structure of FIG. 1 is an example of a network structure of an evolved-UMTS terrestrial radio access network (E-UTRAN). An E-UTRAN system may be a 3GPP LTE/LTE-A system. An evolved-UMTS terrestrial radio access network (E-UTRAN) includes a user equipment (UE) 10 and a base station (BS) 20 which provides a control plane and a user plane to the UE. The user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Interfaces for transmitting user traffic or control traffic may be used between the BSs 20. The BSs 20 are interconnected by means of an X2 interface. The BSs 20 are connected to an evolved packet core (EPC) by means of an S1 interface. The EPC may consist of a mobility management entity (MME) 30, a serving gateway (S-GW), and a packet data network (PDN) gateway (PDN-GW). The MME has UE access information or UE capability information, and such information may be primarily used in UE mobility management. The S-GW is a gateway of which an endpoint is an E-UTRAN. The PDN-GW is a gateway of which an endpoint is a PDN. The BSs 20 are connected to the MME 30 by means of an S1-MME, and are connected to the S-GW by means of S1-U. The S1 interface supports a many-to-many relation between the BS 20 and the MME/S-GW 30.

Hereinafter, a downlink (DL) denotes communication from the BS 20 to the UE 10, and an uplink (UL) denotes communication from the UE 10 to the BS 20. In the DL, a transmitter may be a part of the BS 20, and a receiver may be a part of the UE 10. In the UL, the transmitter may be a part of the UE 10, and the receiver may be a part of the BS 20.

Figure 2:
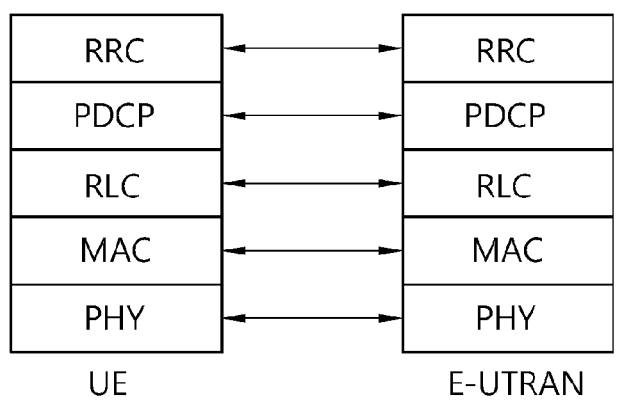
FIG. 2 is a diagram showing radio interface protocol architecture for a control plane.
Figure 3:
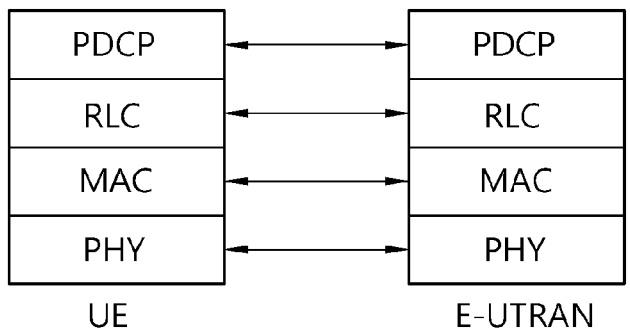
FIG. 3 is a diagram showing radio interface protocol architecture for a user plane.

FIG. 2 is a diagram showing radio interface protocol architecture for a control plane. FIG. 3 is a diagram showing radio interface protocol architecture for a user plane.

Layers of a radio interface protocol between the UE and the E-UTRAN can be classified into a first layer (L1), a second layer (L2), and a third layer (L3) based on the lower three layers of the open system interconnection (OSI) model that is well-known in the communication system. The radio interface protocol between the UE and the E-UTRAN can be horizontally divided into a physical layer, a data link layer, and a network layer, and can be vertically divided into a control plane which is a protocol stack for control signal transmission and a user plane which is a protocol stack for data information transmission. The layers of the radio interface protocol exist in pairs at the UE and the E-UTRAN.

A physical (PHY) layer belonging to the L1 provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface. Between different PHY layers, i.e., a PHY layer of a transmitter and a PHY layer of a receiver, data is transferred through the physical channel. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH can carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ ACK/NACK signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
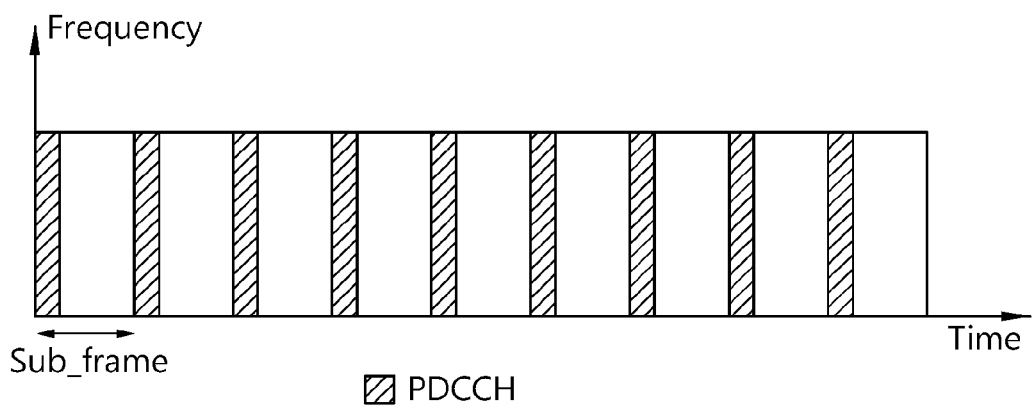
FIG. 4 shows an example of a physical channel structure.

FIG. 4 shows an example of a physical channel structure.

A physical channel consists of a plurality of subframes in a time domain and a plurality of subcarriers in a frequency domain. One subframe consists of a plurality of symbols in the time domain. One subframe consists of a plurality of resource blocks (RBs). One RB consists of a plurality of symbols and a plurality of subcarriers. In addition, each subframe can use specific subcarriers of specific symbols of a corresponding subframe for a PDCCH. For example, a first symbol of the subframe can be used for the PDCCH. A transmission time interval (TTI) which is a unit time for data transmission may be equal to a length of one subframe.

A DL transport channel for transmitting data from the network to the UE includes a broadcast channel (BCH) for transmitting system information, a paging channel (PCH) for transmitting a paging message, a DL-SCH for transmitting user traffic or control signals, etc. The system information carries one or more system information blocks. All system information blocks can be transmitted with the same periodicity. Traffic or control signals of a multimedia broadcast/multicast service (MBMS) are transmitted through a multicast channel (MCH). Meanwhile, a UL transport channel for transmitting data from the UE to the network includes a random access channel (RACH) for transmitting an initial control message, a UL-SCH for transmitting user traffic or control signals, etc.

A MAC layer belonging to the L2 provides a service to a higher layer, i.e., a radio link control (RLC), through a logical channel. A function of the MAC layer includes mapping between the logical channel and the transport channel and multiplexing/de-multiplexing for a transport block provided to a physical channel on a transport channel of a MAC service data unit (SDU) belonging to the logical channel. The logical channel is located above the transport channel, and is mapped to the transport channel. The logical channel can be divided into a control channel for delivering control region information and a traffic channel for delivering user region information. The logical includes a broadcast control channel (BCCH), a paging control channel (PCCH), a common control channel (CCCH), a multicast control channel (MCCH), a multicast traffic channel (MTCH), etc.

An RLC layer belonging to the L2 supports reliable data transmission. A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ). Meanwhile, a function of the RLC layer can be implemented with a functional block inside the MAC layer. In this case, the RLC layer may not exist.

A packet data convergence protocol (PDCP) layer belongs to the L2. A function of a packet data convergence protocol (PDCP) layer in the user plane includes user data delivery, header compression, and ciphering. The header compression has a function for decreasing a size of an IP packet header which contains relatively large-sized and unnecessary control information, to support effective transmission in a radio section having a narrow bandwidth. A function of a PDCP layer in the control plane includes control-plane data delivery and ciphering/integrity protection.

A radio resource control (RRC) layer belonging to the L3 is defined only in the control plane. The RRC layer takes a role of controlling a radio resource between the UE and the network. For this, the UE and the network exchange an RRC message through the RRC layer. The RRC layer serves to control the logical channel, the transport channel, and the physical channel in association with configuration, reconfiguration, and release of RBs. An RB is a logical path provided by the L2 for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

A radio resource state (RRC) state indicates whether an RRC of a user equipment (UE) is logically connected to an RRC of a network. When an RRC connection is established between an RRC layer of the UE and an RRC layer of the network, the UE is in an RRC connected state (RRC CONNECTED), and otherwise the UE is in an RRC idle state (RRC_IDLE). Since the UE in the RRC_CONNECTED has the RRC connection established with the network, the network can recognize the existence of the UE in the RRC_CONNECTED and can effectively control the UE. Meanwhile, the UE in the RRC_IDLE cannot be recognized by the network, and a core network (CN) manages the UE in unit of a tracking area (TA) which is a larger area than a cell. That is, only the existence of the UE in the RRC_IDLE is recognized in unit of a large area, and the UE must transition to the RRC_CONNECTED to receive a typical mobile communication service such as voice or data communication.

When the user initially powers on the UE, the UE first searches for a proper cell and then remains in the RRC_IDLE in the cell. When there is a need to establish an RRC connection, the UE which remains in the RRC_IDLE may establish the RRC connection with the RRC of the network through an RRC connection procedure and then may transition to the RRC_CONNECTED. The UE which remains in the RRC_IDLE may need to establish the RRC connection with the network when uplink data transmission is necessary due to a user's call attempt or the like or when there is a need to transmit a response message upon receiving a paging message from the network.

A non-access stratum (NAS) layer belongs to an upper layer of the RRC layer and serves to perform session management, mobility management, or the like. To manage mobility of the UE in the NAS layer, two states, i.e., an EPS mobility management (EMM)-REGISTERED state and an EMM-DEREGISTERED state, can be defined. The two states are applicable to the UE and the MME. The UE is initially in the EMM-DEREGISTERED. To access the network, the UE may perform a process of registering to the network through an initial attach procedure. If the initial attach procedure is successfully performed, the UE and the MME may be in the EMM-REGISTERED.

In addition, to manage a signaling connection between the UE and the EPC, two states, i.e., an EPS connection management (ECM)-IDLE state and an ECM-CONNECTED state, can be defined. The two states are applicable to the UE and the MME. When the UE in the ECM-IDLE establishes an RRC connection with the E-UTRAN, the UE may be in the ECM-CONNECTED. When the MME in the ECM-IDLE establishes an S1 connection with the E-UTRAN, the MME may be in the ECM-CONNECTED. When the UE is in the ECM-IDLE, the E-UTRAN does not have information on the context of the UE. Therefore, the UE in the ECM-IDLE can perform a UE-based mobility related procedure such as cell selection or cell reselection without having to receive a command of the network. If a location of the UE in the ECM-IDLE becomes different from a location known to the network, the UE may report the location of the UE to the network through a tracking area update procedure. On the other hand, the mobility of the UE in the ECM-CONNECTED may be managed by the command of the network.

Figure 5:
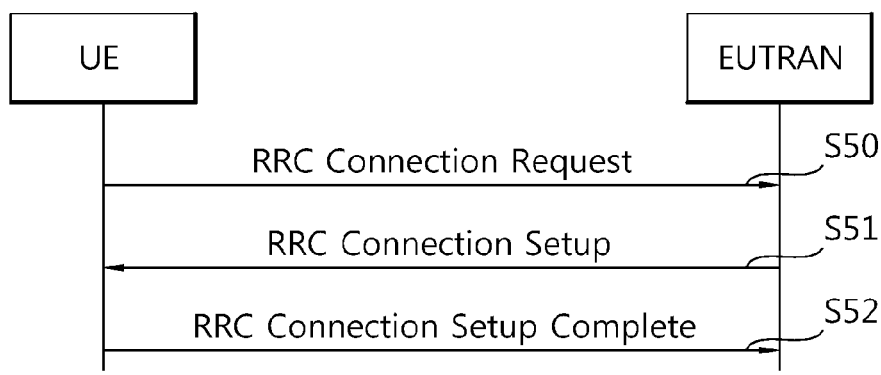
FIG. 5 shows an RRC connection establishment procedure.

FIG. 5 shows an RRC connection establishment procedure. It may be referred to Section 5.3.3 of 3GPP TS 36.331 V10.5.0 (2012 March). The purpose of this procedure is to establish an RRC connection. The RRC connection establishment may involve SRB1 establishment. The RRC connection establishment procedure is also used to transfer the initial NAS dedicated information/message from the UE to the E-UTRAN. The E-UTRAN may apply the RRC connection establishment procedure to establish SRB1 only.

Referring to FIG. 5, at step S50, the UE transmits an RRC connection request (RRCConnectionRequest) message to the E-UTRAN. At step S51, the E-UTRAN transmits an RRC connection setup (RRCConnectionSetup) message to the UE. At step S52, the UE transmits an RRC connection setup complete (RRCConnectionSetupComplete) message to the E-UTRAN.

Figure 6:
FIG. 6 shows an initial security activation procedure.

FIG. 6 shows an initial security activation procedure. It may be referred to Section 5.3.4 of 3GPP TS 36.331 V10.5.0 (2012 March). The purpose of this procedure is to activate access stratum (AS) security upon RRC connection establishment.

Referring to FIG. 6, at step S60, the E-UTRAN transmits a security mode command (SecurityModeCommand) message to the UE. At step S61, the UE transmits a security mode complete (SecurityModeComplete) message to the E-UTRAN.

Figure 7:
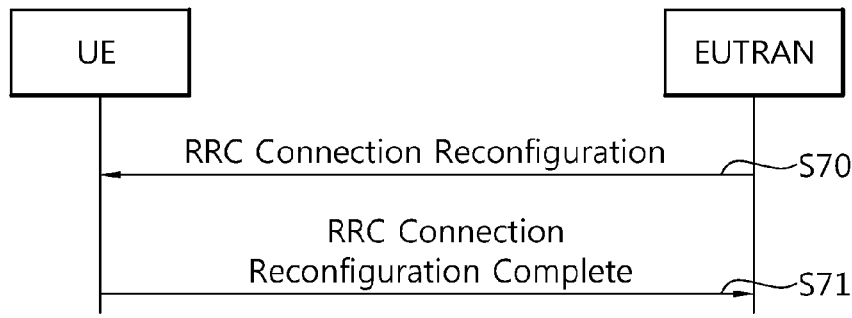
FIG. 7 shows an RRC connection reconfiguration procedure.

FIG. 7 shows an RRC connection reconfiguration procedure. It may be referred to Section 5.3.5 of 3GPP TS 36.331 V10.5.0 (2012 March). The purpose of this procedure is to modify an RRC connection, e.g. to establish/modify/release RBs, to perform handover, to setup/modify/release measurements, to add/modify/release secondary cells (SCells). As part of the RRC connection reconfiguration procedure, NAS dedicated information may be transferred from the E-UTRAN to the UE.

Referring to FIG. 7, at step S70, the E-UTRAN transmits an RRC connection reconfiguration (RRCConnectionReconfiguration) message to the UE. At step S71, the UE transmits an RRC connection reconfiguration complete (RRCConnectionReconfigurationComplete) message to the E-UTRAN.

Figure 8:
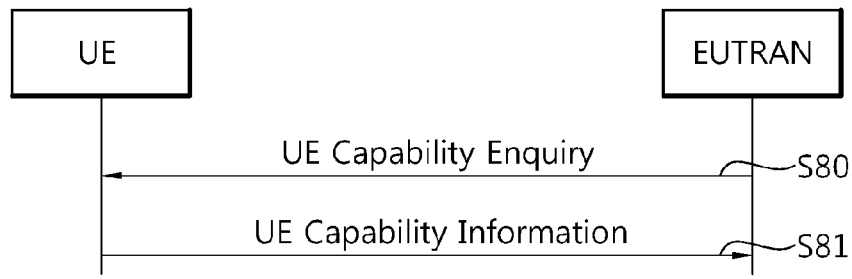
FIG. 8 shows a UE capability transfer procedure.

FIG. 8 shows a UE capability transfer procedure. It may be referred to Section 5.6.3 of 3GPP TS 36.331 V10.5.0 (2012 March). The purpose of this procedure is to transfer UE radio access capability information from the UE to the E-UTRAN. If the UE has changed its E-UTRAN radio access capabilities, the UE shall request higher layers to initiate the necessary NAS procedures that would result in the update of UE radio access capabilities using a new RRC connection.

Referring to FIG. 8, at step S80, the E-UTRAN transmits a UE capability enquiry (UECapabilityEnquiry) message to the UE. At step S81, the UE transmits a UE capability information (UECapabilityInformation) message to the E-UTRAN.

Figure 9:
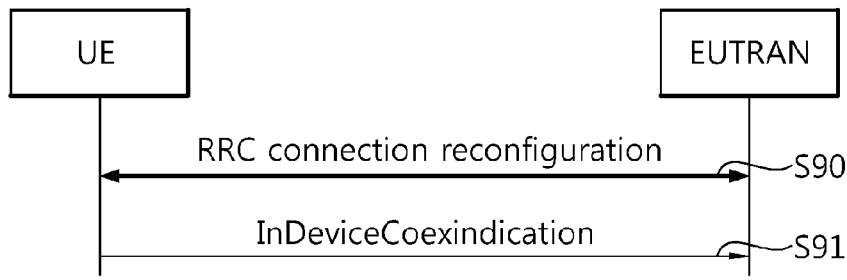
FIG. 9 shows an in-device coexistence (IDC) indication procedure.

FIG. 9 shows an in-device coexistence (IDC) indication procedure. The purpose of this procedure is to inform the E-UTRAN about (a change of) IDC problems experienced by the UE in RRC_CONNECTED and to provide the E-UTRAN with information in order to resolve them.

Referring to FIG. 9, at step S90, the UE and the E-UTRAN performs an RRC connection reconfiguration procedure. At step S91, the UE transmits an in-device coexistence indication (IndeviceCoexIndication) message to the E-UTRAN.

In 3GPP LTE, a BS needs to know a type of data and an amount of data which each user wants to transmit for using uplink radio resources efficiently. For downlink radio resources, a BS can know an amount of data need to be transmitted to each user through downlink, since the data to be transmitted through the downlink is transferred from an access gateway to the BS. On the other hand, for uplink radio resources, if a UE does not inform a BS information on data to be transmitted through uplink, the BS cannot know how much uplink radio resources are required for each UE. Therefore, for a BS to allocate uplink radio resources to a UE properly, the UE is required to provide information for scheduling the uplink radio resources to the BS.

Accordingly, if there is data to be transmitted to a BS, a UE inform the BS that the UE has the data to be transmitted to the BS, and the BS allocates proper uplink radio resources to the UE based on the information. This procedure is called a buffer status reporting (BSR) procedure.

In addition, transmit power needs to be properly regulated in order for a UE to transmit data to a BS. When the transmit power is too low, the BS may not be able to correctly receive the data. When the transmit power is too high, even though the UE can receive data without any problem, it may act as an interference to another UE for receiving data. Therefore, the BS needs to optimize power used in uplink transmission of the UE from a system aspect.

In order for the BS to regulate the transmit power of the UE, essential information must be acquired from the UE. For this, power headroom reporting (PHR) of the UE is used. A power headroom implies power that can be further used in addition to the transmit power currently used by the UE. That is, the power headroom indicates a difference between maximum possible transmit power that can be used by the UE and the currently used transmit power. Upon receiving the PHR from the UE, the BS can determine transmit power used for uplink transmission of the UE at a next time on the basis of the received PHR. The determined transmit power of the UE can be indicated by using a size of a resource block (RB) and a modulation and coding scheme (MCS), and can be used when an uplink (UL) grant is allocated to the UE at a next time. Since radio resources may be wasted if the UE frequently transmits the PHR, the UE can define a PHR trigger condition and transmit the PHR only when the condition is satisfied.

Device-to-device (D2D) connection is described below.

The D2D connection is a connection between one master UE (M-UE) and one slave UE (S-UE). That is, the D2D connection is a direct connection between UEs. The M-UE may control the D2D connection with the S-UE autonomously (i.e. UE autonomous mode) or under full/partial control of an E-UTRAN (i.e. E-UTRAN planned mode). One M-UE may configure zero, one or more D2D connections. Different D2D connections may be established with different S-UEs.

The E-UTRAN may configure following two D2D modes in a cell. Only one D2D mode may be configured for a specific cell, for a specific M-UE, for a specific S-UE, or for a specific D2D connection between one M-UE and one S-UE.

1) E-UTRAN planned mode: The E-UTRAN (i.e. eNodeB (eNB) serving the M-UE called 'serving eNB') is responsible for maintaining D2D connection (in terms of radio resource or quality of service (QoS) over D2D connection). The serving eNB has S-UE context for the S-UE connected to the M-UE. A mobility management entity (MME) connected to the serving eNB has S-UE context for the S-UE connected to the M-UE.

2) UE autonomous mode: The M-UE is responsible for maintaining D2D connection (in terms of radio resource or QoS over D2D connection). The serving eNB has no S-UE context for the S-UE connected to the M-UE. The MME connected to the serving eNB may or may not have S-UE context for the S-UE connected to the M-UE.

The S-UE may or may not have an RRC connection with either the serving eNB or another eNB for both modes.

In addition, a D2D hybrid mode may be defined. In the D2D hybrid mode, both the UE autonomous mode and the E-UTRAN planned mode are used for a single D2D connection between one M-UE and one S-UE. Which mode between the UE autonomous and the E-UTRAN planned mode is used for the D2D connection may depend on QoS of D2D radio bearers between the M-UE and the S-UE. For example, a D2D DRB for voice or video service may be established based on the E-UTRAN planned mode. A D2D DRB for data downloading/uploading service may be established based on the UE autonomous mode. Semi-persistent scheduling (SPS) transmissions over the D2D connection may be configured by the serving eNB in the E-UTRAN Planned Mode. Which mode between the UE autonomous and E-UTRAN planned mode is used for the D2D connection may decided by the serving eNB. When the M-UE makes a D2D connection with the S-UE, the M-UE may transmit information about this D2D connection establishment to the serving eNB. Upon receiving the information from the M-UE, the serving eNB ma inform the M-UE which mode should be configured for this D2D connection among the UE autonomous, the E-UTRAN planned, and the hybrid mode.

Hereinafter, it is assumed that the serving eNB is an eNB serving the M-UE. If the eNB serves the S-UE, but it does not serve the M-UE, the eNB is clearly written as 'S-UE serving eNB' hereinafter. When the S-UE serving eNB is used to express a certain procedure, 'M-UE serving eNB' may be also used.

Followings are identities used for the D2D connection.
M-CRNTI: cell radio network temporary identity (C-RNTI) allocated for the M-UE
S-CRNTI: C-RNTI allocated for the S-UE
S-UE identity: The S-UE identity may correspond to one of an international mobile subscriber identity (IMSI), a system architecture evolution (SAE) temporary mobile subscriber identity (S-TMSI), an S-CRNTI, and a new UE identity allocated to the S-UE. The S-UE identity may be allocated by the M-UE, the M-UE serving eNB, the S-UE serving eNB, or an EPC node such as MME/home location register (HLR).

Followings are channels used for the D2D connection.
D2D downlink: a direction from the M-UE to the S-UE
D2D uplink: a direction from the S-UE to the M-UE
D-BCCH: D2D downlink broadcast control channel used over the D2D connection. The M-UE broadcasts the D-BCCH to one or more S-UEs, e.g. for delivery of D2D system information or helping an S-UE detect another UE for the D2D connection.
D-RACH: D2D uplink random access channel used over the D2D connection. The M-UE may allocate radio resources for the D-RACH. The S-UE may know configuration of the D-RACH by receiving information on the D-BCCH. The S-UE may transmit a preamble or message over the D-RACH to the M-UE, in order to make a connection with the M-UE or in order to transmit data to the M-UE.
D-CCCH: D2D uplink/downlink common control channel used over the D2D connection.
D-DCCH: D2D uplink/downlink dedicated control channel used over the D2D connection.
D2D RB: radio bearer which is established over the D2D connection between the M-UE and the S-UE. A DRB and a SRB may be provided for D2D user data and D2D control info, respectively.

A method for transmitting a D2D related message according to embodiments of the present invention is described below.

Figure 10:
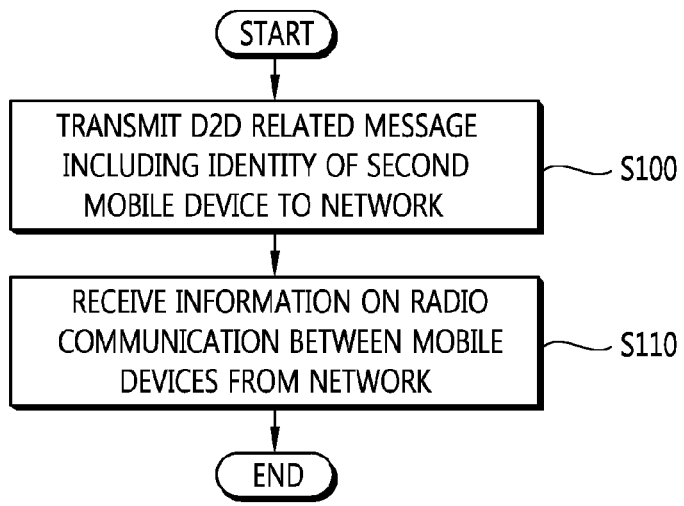
FIG. 10 shows an example of a method for transmitting a D2D related message according to an embodiment of the present invention.

FIG. 10 shows an example of a method for transmitting a D2D related message according to an embodiment of the present invention.

A first mobile device may be an M-UE of D2D connection. A second mobile device may be an S-UE D2D connection. It is assumed that the first mobile device establishes a connection with a network, and the first mobile device establishes a connection with the second mobile device. Also, it is assumed that the network supports or allows a radio communication between mobile devices. The first mobile device may receive a D2D related message from the second mobile device. The D2D related message may include an identity of the second device.

At step S100, the first mobile device transmits a D2D related message including the identity of the second mobile device to a network. At step S110, the first mobile device receives information on a radio communication between the first mobile device and the second mobile device from the network. The first mobile device may inform the second mobile device of the received information on the radio communication between the first mobile device and the second mobile device. The identity of the second mobile device may be one of an S-CRNTI or S-UE identity.

The information on the radio communication between the first mobile device and the second mobile device may include at least one of followings:

Another identity of the second mobile device, which is allocated by the network and will be used for the radio communication between the mobile devices Security parameters used for activating security of the radio communication between the mobile devices Capability of the second mobile device QoS parameters used for (re)configuring radio bearers between the mobile devices Radio parameters used for (re)configuring radio bearers between the mobile devices.

Radio resources allocated to either the first mobile device or the second mobile device for the radio communication between the mobile devices Decision on whether the mobile devices perform D2D communication under the network control or not Decision on whether establishment of the D2D connection between the mobile devices should be rejected or not Decision on release of the D2D connection between the mobile devices Decision on selection of time division duplex (TDD) and frequency division duplex (FDD) over the D2D connection between the mobile devices Decision on selection of broadcast transmission, multicast transmission and unicast transmission for the radio communication between the mobile devices Information related to one or more neighboring cells Measurement configuration that the second mobile device applies for measuring a channel quality of a mobile device or a neighboring cell.

Further, the first mobile device may receive a channel quality of a radio interface between the mobile devices from the second mobile device, and may transmit the received channel quality to the network. The channel quality may be measured by the second mobile device.

Further, the first mobile device may receive a PHR of the second mobile device from the second mobile device, and may transmit the received PHR to the network.

Further, the first mobile device may receive a service type (e.g. voice) of the D2D connection between the mobile devices from the second mobile device, and may transmit the received service type to the network.

Figure 11:
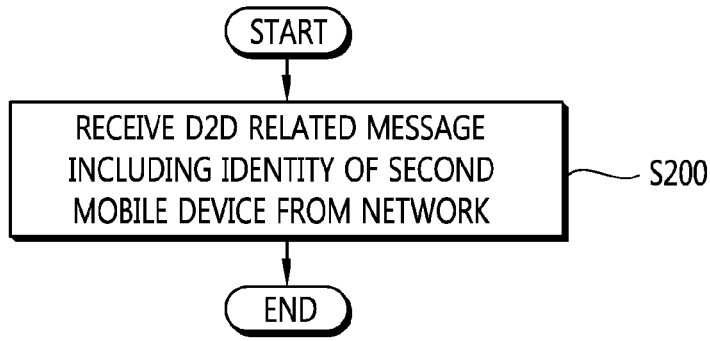
FIG. 11 shows an example of a method for receiving a D2D related message according to an embodiment of the present invention.

FIG. 11 shows an example of a method for receiving a D2D related message according to an embodiment of the present invention.

At step S200, the first mobile device receives a D2D related message including the identity of the second mobile device to a network. The identity of the second mobile device may be one of an S-CRNTI or S-UE identity.

Hereinafter, various embodiments of the present invention to which embodiments of the present invention shown in FIG. 10 and FIG. 11 are applied are described.

Figure 12:
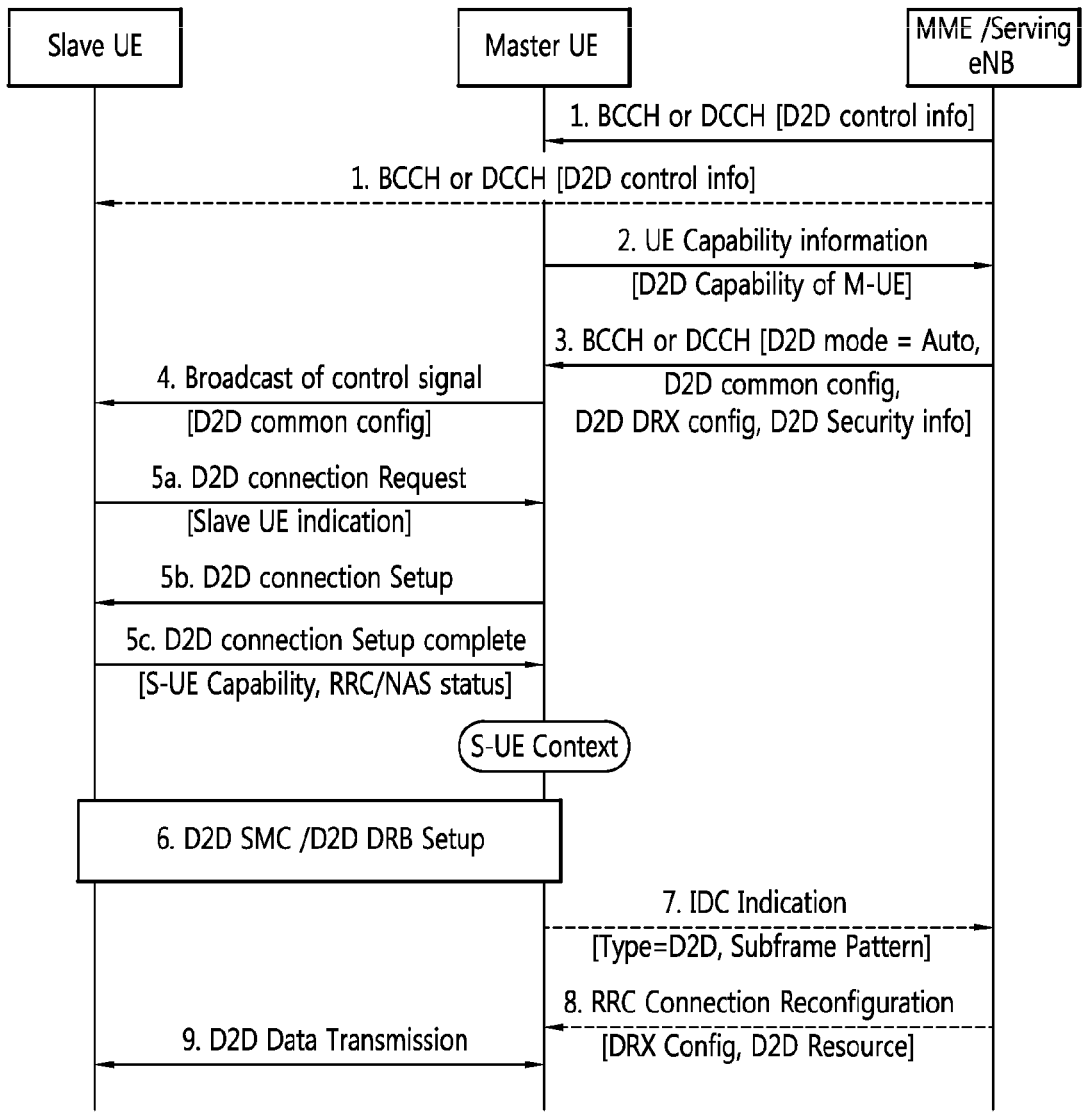
FIG. 12 shows an example of a D2D connection establishment and data transmission for a UE autonomous mode according to an embodiment of the present invention.

FIG. 12 shows an example of a D2D connection establishment and data transmission for a UE autonomous mode according to an embodiment of the present invention.

1. A serving eNB may broadcast D2D control information on a BCCH or a DCCH. The D2D control information may include a set of D-BCCH resources and a set of D2D random access resources including a set of D2D random access preamble identifiers (RAPIDs). The M-UE may receive D2D control information from the serving eNB.

2. If the M-UE supports D2D connection (as D2D M-UE), and if the serving eNB broadcasts/transmits the D2D control information to the M-UE, the M-UE transmits UE capability information including a D2D capability of the M-UE to the serving eNB. The D2D capability may be divided into a D2D master capability and a D2D slave capability. If a UE supports the D2D master capability, the UE can operate as an M-UE. If a UE supports the D2D slave capability, the UE can operate as an S-UE. Here, the D2D capability of the M-UE includes at least the D2D master capability.

3. The serving eNB may configure one or more UE for D2D connection via an RRC message on the BCCH or the DCCH. When the serving eNB configures D2D connection, it may indicate which D2D mode the UE should operate in, i.e., a UE autonomous mode or an E-UTRAN planned mode. It is assumed that the UE autonomous mode is configured.

The RRC message may also include a D2D common configuration, a D2D discontinuous reception (DRX) configuration, and D2D security information. The D2D common configuration may include configurations of common channels used over the D2D connection, such as D-RACH, D-BCCH and D-CCCH. The D2D DRX configuration may contain a possible DRX configuration which may be used for one or more D2D connections. The D2D security information may be used for security mode command (SMC) procedure over the D2D connection.

4. The M-UE broadcasts a control signal on the D-BCCH by using D-BCCH configuration contained in the D2D common configuration. Some of D2D common configuration may be broadcast over the D-BCCH, hopefully up to the S-UE.

The S-UE may receive the D2D control information from the serving eNB or another eNB. By using the D2D control information, the S-UE may detect the M-UE via the D-BCCH. The S-UE may acquire some of the D2D common configuration from the D-BCCH, such as configurations of D-RACH and D-CCCH.

5a. When the S-UE detects the M-UE, an RRC layer of the S-UE informs this detection to upper layers of the S-UE. A NAS layer of the S-UE may request the RRC layer of the S-UE to make a D2D connection. The S-UE transmits a D2D connection request message to the M-UE. The S-UE may indicate 'slave UE indication' to the M-UE via the D2D connection request message (or D2D connection setup complete message), in order to inform the M-UE that the S-UE wishes to be connected to the M-UE as a slave UE.

5b. If the M-UE accepts the D2D connection request message from the S-UE, the M-UE transmits a D2D connection setup message to the S-UE.

5c. Then, the S-UE transmits a D2D connection setup complete message to the M-UE to finalize the D2D connection establishment. The D2D connection setup complete message may contain S-UE's D2D capability including at least the slave D2D capability.

The D2D connection setup complete message may also contain RRC/NAS status that indicates the following S-UE status information.

Whether or not the S-UE is connected to a radio access network (RAN), i.e. whether the S-UE is in RRC CONNECTED or in RRC IDLE Which type of RAN the S-UE is connected to, i.e. one of E-UTRAN, UTRAN FDD, UTRAN TDD, GSM/EDGE radio access network (GERAN), CDMA2000 high rate packet data (HRPD), CDMA2000 1xRTT, and Wi-Fi (IEEE 802 access point)

Identity of a cell which the S-UE is connected to or camping on

Whether or not the S-UE is attached to a core network

Which type of core network the S-UE is attached, i.e. one of EPC, 3G CS, 3G PS, 2G GSM, and CDMA2000 CN Whether or not the S-UE is registered in any public land mobile network (PLMN)

Which type of PLMN the S-UE is registered in, i.e. one of home PLMN (HPLMN), equivalent HPLMN (EH-PLMN), and visited PLMN (VPLMN)

PLMN identity of PLMN which the S-UE is registered in

6. The M-UE initiates a security mode command procedure by using the D2D security information, and a DRB setup procedure for this D2D connection. As a result of those procedures, the S-UE and the M-UE are ready for D2D transmission over DRBs over the secure D2D connection.

7. The M-UE may transmit an IDC indication to coordinate interference between an RRC connection with the serving eNB and the D2D connection with the S-UE. The IDC indication may indicate 'D2D device' and subframe patterns impacted by the D2D connection, in order to inform the E-UTRAN which type of device the M-UE experience D2D interference from/to and which subframes the D2D interference might occur in.

8. Based on the IDC indication, the serving eNB may configure the D2D connection by transmitting a D2D radio resource configuration and a D2D DRX configuration. The M-UE may configure the D2D connection and schedule/grant DL/UL resource over the D2D connection by using the D2D radio resource configuration. The M-UE may also configure DRX of the S-UE (i.e. discontinuous transmission (DTX) of the M-UE) over the D2D connection or DTX of the S-UE (i.e. DRX of the M-UE) over the D2D connection by using the D2D DRX configuration.

9. The M-UE and the S-UE performs D2D data transmission over the D2D connection.

Figure 13:
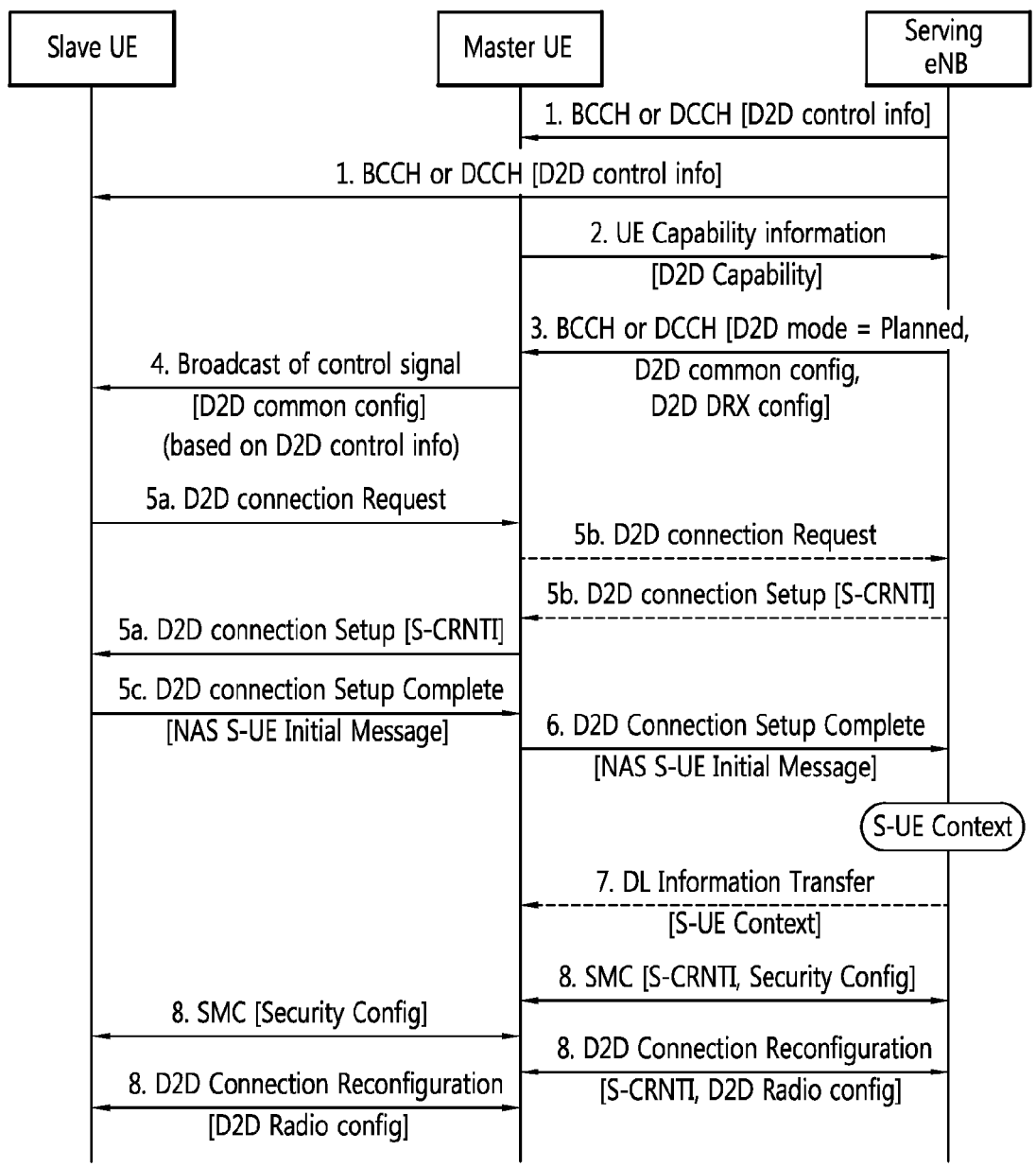
FIG. 13 shows an example of a D2D connection establishment for an E-UTRAN planned mode according to an embodiment of the present invention.

FIG. 13 shows an example of a D2D connection establishment for an E-UTRAN planned mode according to an embodiment of the present invention.

1. A serving eNB may broadcast D2D control information on a BCCH or a DCCH. The D2D control information may include a set of D-BCCH resources and a set of D2D random access resources including a set of D2D RAPIDs. The M-UE and the S-UE may receive D2D control information from the serving eNB.

2. If the M-UE supports D2D connection (as D2D M-UE), and if the serving eNB broadcasts/transmits the D2D control information to the M-UE, the M-UE transmits UE capability information including a D2D capability of the M-UE to the serving eNB. The D2D capability may be divided into a D2D master capability and a D2D slave capability. If a UE supports the D2D master capability, the UE can operate as an M-UE. If a UE supports the D2D slave capability, the UE can operate as an S-UE. Here, the D2D capability of the M-UE includes at least the D2D master capability.

3. The serving eNB may configure one or more UE for D2D connection via an RRC message on the BCCH or the DCCH. When the serving eNB configures D2D connection, it may indicate which D2D mode the UE should operate in, i.e., a UE autonomous mode or an E-UTRAN planned mode. It is assumed that the E-UTRAN planned mode is configured.

The RRC message may also include a D2D common configuration, and a D2D DRX configuration. The D2D common configuration may include configurations of common channels used over the D2D connection, such as D-RACH, D-BCCH and D-CCCH. The D2D DRX configuration may contain a possible DRX configuration which may be used for one or more D2D connections.

4. The M-UE broadcasts a control signal on the D-BCCH by using D-BCCH configuration contained in the D2D common configuration based on the D2D control information. Some of D2D common configuration may be broadcast over the D-BCCH, hopefully up to the S-UE.

The S-UE may receive the D2D control information from the serving eNB or another eNB. By using the D2D control information, the S-UE may detect the M-UE via the D-BCCH. The S-UE may acquire some of the D2D common configuration from the D-BCCH, such as configurations of D-RACH and D-CCCH.

5a. When the S-UE detects the M-UE, an RRC layer of the S-UE informs this detection to upper layers of the S-UE. A NAS layer of the S-UE may request the RRC layer of the S-UE to make a D2D connection. The S-UE transmits a D2D connection request message to the M-UE, and receives a D2D connection setup message from the M-UE.

5b. In the E-UTRAN planned mode, the M-UE may transfer the received D2D connection request message to the serving eNB. Then, if the serving eNB transmits a D2D connection setup message to the M-UE, the M-UE transmits the received D2D connection setup message to S-UE.

In addition, the serving eNB may allocate an S-CRNTI for this the S-UE via the D2D connection setup message. That is, a D2D related message including an identity of the S-UE is transmitted from the serving eNB to the M-UE, as shown in FIG. 11. The M-UE uses this S-CRNTI to identify this S-UE in a later message.

5c. After receiving the D2D connection setup message from the M-UE, the S-UE transmits a D2D connection setup complete message to the M-UE to finalize the D2D connection establishment. The D2D connection setup complete message may contain a NAS S-UE initial message as well as an optional PLMN ID and MME ID.

6. If the NAS S-UE initial message is received from the S-UE, the M-UE selects an MME for the S-UE e.g. by using the PLMN ID and the MME ID, and then transmits the D2D connection setup complete message including the NAS S-UE initial message to the MME via the serving eNB. If the NAS S-UE initial message is not received from the S-UE via the D2D connection setup complete message, the M-UE may configure the UE autonomous mode and then notify this mode to the serving eNB.

7. The serving eNB (and also the M-UE) receives S-UE context from the MME. The S-UE context may contain QoS information, security information, S-UE capability information, and so on, like normal UE context which is stored in the MME for registered UE.

8. The serving eNB initiates a security mode command procedure and a DRB setup procedure for this D2D connection. An SMC message and a D2D connection reconfiguration message are transmitted from the serving eNB to the S-UE via the M-UE. The serving eNB uses the S-CRNTI to identify the S-UE that should receive the SMC message and the D2D connection reconfiguration message. As a result of those procedures, the S-UE and the M-UE are ready for D2D transmission over DRBs over the secure D2D connection.

Figure 14:
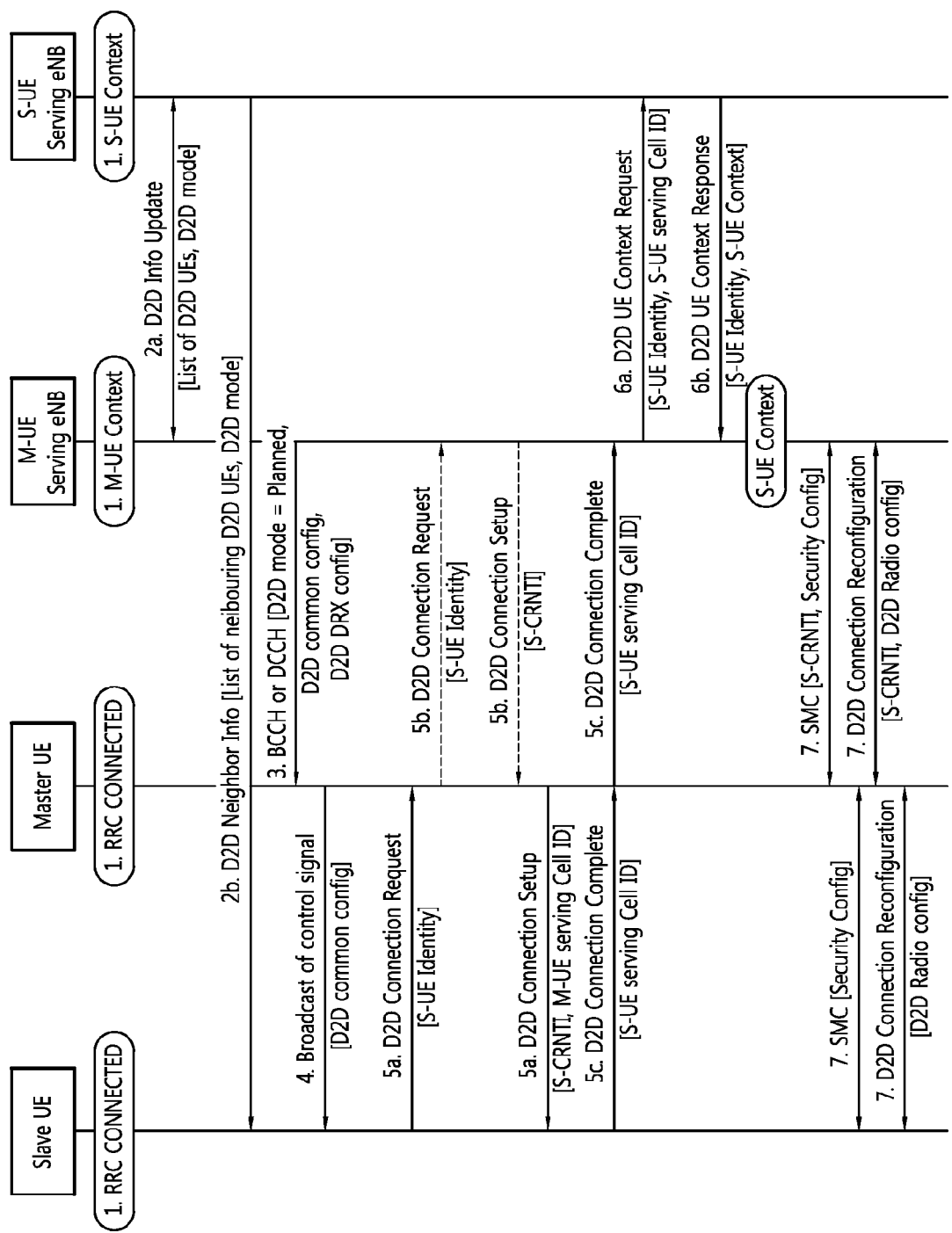
FIG. 14 shows another example of a D2D connection establishment for an E-UTRAN planned mode according to an embodiment of the present invention.

FIG. 14 shows another example of a D2D connection establishment for an E-UTRAN planned mode according to an embodiment of the present invention.

1. It is assumed that the S-UE is connected to the S-UE serving eNB and the M-UE is connected to the M-UE serving eNB. Thus, the S-UE and the M-UE are in RRC_CONNECTED. The M-UE serving eNB has M-UE context. The S-UE serving eNB has S-UE context. The M-UE serving eNB may broadcast D2D control information that includes a set of D-BCCH resources and a set of D2D random access resources including a set of D2D RAPIDs.

2a. eNBs may exchange information about D2D connection. For instance, the M-UE serving eNB may inform the S-UE serving eNB of the D2D connection such as information on UEs connected to the M-UE serving eNB (e.g. list of UE identities) and a D2D mode. Likewise, the S-UE serving eNB may inform the M-UE serving eNB of the D2D connection such as information on UEs connected to the M-UE serving eNB (e.g. list of UE identities) and a D2D mode.

2b. eNB may share the exchanged information with UEs connected to this eNB. The UEs may use this information to detect neighboring UEs for D2D connection establishment.

3. The serving eNB may configure one or more UE for D2D connection via an RRC message on the BCCH or the DCCH. When the serving eNB configures D2D connection, it may indicate which D2D mode the UE should operate in, i.e., a UE autonomous mode or an E-UTRAN planned mode. It is assumed that the E-UTRAN planned mode is configured.

The RRC message may also include a D2D common configuration, and a D2D DRX configuration. The D2D common configuration may include configurations of common channels used over the D2D connection, such as D-RACH, D-BCCH and D-CCCH. The D2D DRX configuration may contain a possible DRX configuration which may be used for one or more D2D connections.

4. The M-UE broadcasts a control signal on the D-BCCH by using D-BCCH configuration contained in the D2D common configuration based on the D2D control information. Some of D2D common configuration may be broadcast over the D-BCCH, hopefully up to the S-UE.

The S-UE may receive the D2D control information from the serving eNB or another eNB. By using the D2D control information, the S-UE may detect the M-UE via the D-BCCH. The S-UE may acquire some of the D2D common configuration from the D-BCCH, such as configurations of D-RACH and D-CCCH.

5a. When the S-UE detects the M-UE, an RRC layer of the S-UE informs this detection to upper layers of the S-UE. A NAS layer of the S-UE may request the RRC layer of the S-UE to make a D2D connection. The S-UE transmits a D2D connection request message to the M-UE. The D2D connection request message may include an S-UE identity. Then, the S-UE receives a D2D connection setup message from the M-UE. The D2D connection setup message may include an S-CRNTI and an M-UE serving cell ID.

5b. In the E-UTRAN planned mode, the M-UE may transfer the received D2D connection request message including the S-UE identity to the serving eNB. That is, a D2D related message including an identity of the S-UE is transmitted from the M-UE to the serving eNB, as shown in FIG. 10. Then, if the serving eNB transmits a D2D connection setup message to the M-UE, the M-UE transmits the received D2D connection setup message to S-UE.

The serving eNB may allocate an S-CRNTI for this the S-UE via the D2D connection setup message. That is, a D2D related message including an identity of the S-UE is transmitted from the serving eNB to the M-UE, as shown in FIG. 11. The M-UE uses this S-CRNTI to identify this S-UE in a later message.

5c. After receiving the D2D connection setup message from the M-UE, the S-UE transmits a D2D connection setup complete message to the M-UE to finalize the D2D connection establishment. The D2D connection setup complete message may contain an S-UE serving cell ID. The M-UE delivers the received D2D connection setup complete message to the M-UE serving eNB.

6a. If the S-UE serving cell ID is received from the S-UE via the M-UE, the M-UE serving eNB searches the S-UE serving eNB for the S-UE by using the S-UE serving cell ID, and then transmits a D2D UE context request message to the S-UE serving eNB. The D2D UE context request message may include the S-UE identity and the S-UE serving cell ID. If the S-UE serving cell ID is not received, but a NAS S-UE initial message is received from the S-UE via the D2D connection setup complete message, the M-UE may follow the procedure shown in FIG. 13. If the S-UE serving cell ID and the NAS S-UE initial message are not received from the S-UE, the M-UE may configure the UE autonomous mode and then notify this mode to the M-UE/S-UE serving eNB.

6b. When the D2D UE context request message is received from the M-UE serving eNB, the S-UE serving eNB transmits a D2D UE context response message including the S-UE identity and S-UE context to the M-UE serving eNB. The M-UE serving eNB may transmit the received S-UE context to the M-UE. The S-UE context may contain QoS information, security information, S-UE capability Information, and so on, like normal UE context which is stored in an MME for registered UE. The M-UE may receive the S-UE context from the MME via the M-UE serving eNB.

7. The serving eNB initiates a security mode command procedure and a DRB setup procedure for this D2D connection. An SMC message and a D2D connection reconfiguration message are transmitted from the serving eNB to the S-UE via the M-UE. The serving eNB uses the S-CRNTI to identify the S-UE that should receive the SMC message and the D2D connection reconfiguration message. As a result of those procedures, the S-UE and the M-UE are ready for D2D transmission over DRBs over the secure D2D connection.

Figure 15:
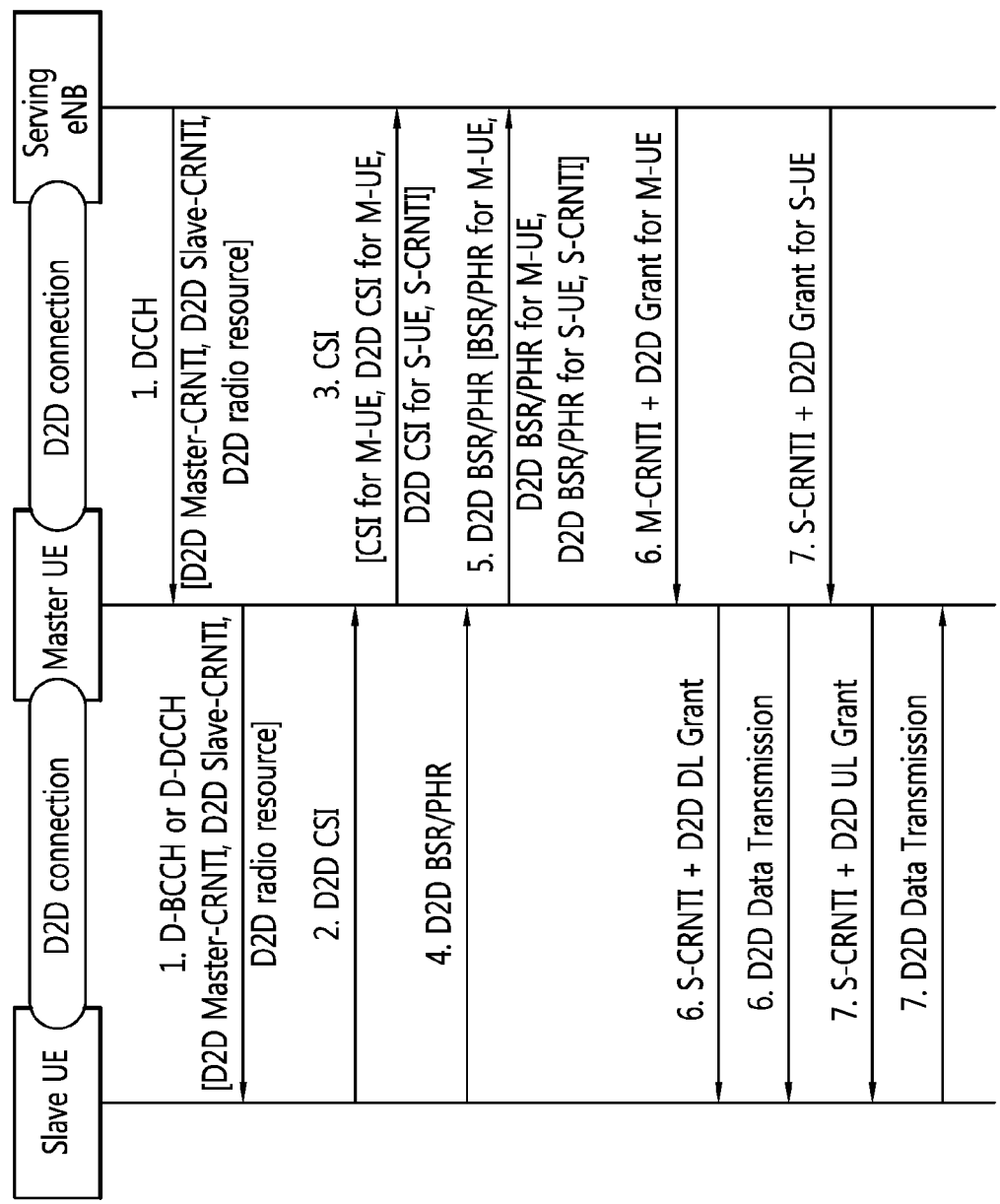
FIG. 15 shows an example of a D2D data transmission for an E-UTRAN planned mode according to an embodiment of the present invention.

FIG. 15 shows an example of a D2D data transmission for an E-UTRAN planned mode according to an embodiment of the present invention. It is assumed that the M-UE and the S-UE have a D2D connection, and the M-UE and the serving eNB have an RRC connection.

1. The serving eNB allocates an M-CRNTI and an S-CRNTI for the M-UE and the S-UE, respectively on a DCCH. Also, the serving eNB may allocate D2D radio resources. The M-UE may transmit the M-CRNTI, the S-CRNTI, and the D2D radio resources to the S-UE on a D-BCCH or a D-DCCH.

2. The S-UE may report D2D channel status information (CSI) to the M-UE in order to inform the M-UE of channel quality of the D2D connection between the M-UE and the S-UE such as reference signal received quality (RSRQ) and reference signal received power (RSRP). Thus, the M-UE may have the following types of CSI:

CSI for RRC connection that the M-UE creates (CSI for M-UE)

CSI for D2D DL connection that the S-UE creates (D2D DL CSI for S-UE)

CSI for D2D UL connection that the M-UE creates (D2D UL CSI for M-UE)

3. The M-UE may report the CSI to the serving eNB. When a physical layer of the M-UE transmits the CSI, the M-UE indicates the type of CSI, i.e. one of CSI type described above, to the serving eNB.

If the D2D CSI is transmitted to the serving eNB, the M-UE may also indicate an S-CRNTI. That is, a D2D related message including an identity of the S-UE is transmitted from the M-UE to the serving eNB, as shown in FIG. 10.

4. A MAC layer of the S-UE may report a BSR or a PHR to the M-UE, via MAC control element, in order to inform the M-UE of a buffer status of the S-UE or a power headroom over the D2D connection. Thus, the M-UE may have the following types of BSR/PHR:

BSR/PHR for RRC connection that the M-UE creates (BSR/PHR for M-UE)

BSR/PHR for D2D DL connection that the M-UE creates (D2D DL BSR/PHR for M-UE)

BSR/PHR for D2D UL connection that the S-UE creates (D2D UL BSR/PHR for S-UE)

5. The M-UE may report the BSR/PHR to the serving eNB. When a MAC layer of the M-UE transmits the BSR/PHR, the M-UE indicates the type of BSR/PHR, i.e. one of BSR/PHR type described above, to the serving eNB, e.g. in header of a MAC protocol data unit (PDU) or a MAC control element.

If the D2D BSR/PHR is transmitted to the serving eNB, the M-UE may also indicate an S-CRNTI, e.g. in header of the MAC PDU or the MAC control element. That is, a D2D related message including an identity of the S-UE is transmitted from the M-UE to the serving eNB, as shown in FIG. 10.

6. The serving eNB may grant D2D DL resources to the M-UE, based on the D2D DL BSR/PHR/CSI with indication of an M-CRNTI on a PDCCH. The M-UE performs D2D data transmission by using the granted D2D DL resources. When the M-UE transmits D2D DL data to the S-UE, the M-UE may indicate the S-CRNTI with the granted D2D DL resources on a D-PDCCH. When the S-CRNTI is indicated in the D-PDCCH, the S-UE receives the D2D DL data via the D2D DL resources.

7. The serving eNB may grant D2D UL resources to the M-UE, based on the D2D UL BSR/PHR/CSI with indication of the M-CRNTI or the S-CRNTI on the PDCCH. Then, the M-UE transmits the granted D2D UL resources to the S-UE by indicating the S-CRNTI on the D-PDCCH. When the S-UE transmits D2D UL data to the M-UE, the S-UE may transmit the D2D UL data via the granted D2D UL resources.

Figure 16:
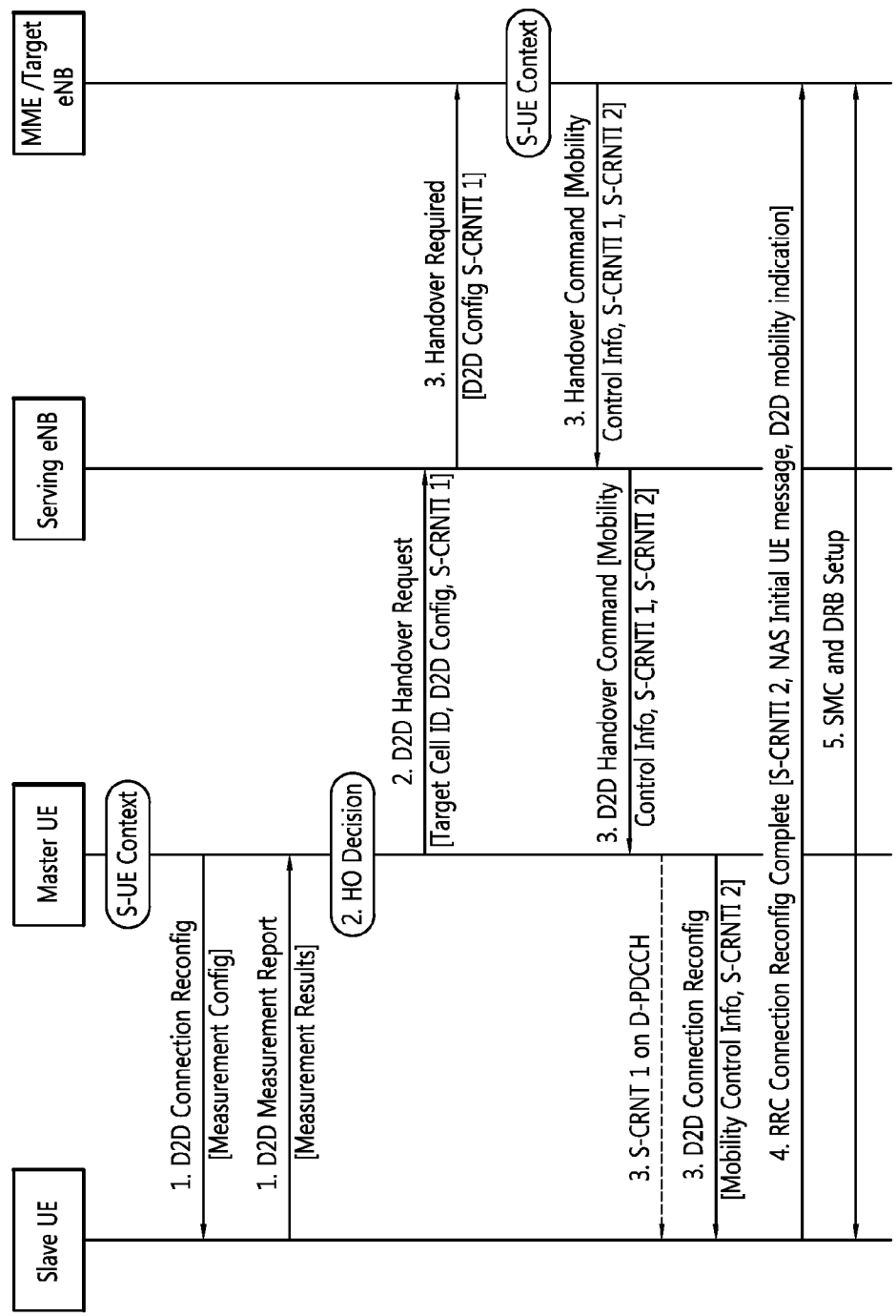
FIG. 16 shows an example of D2D mobility from an M-UE to a target eNB in a UE autonomous mode according to an embodiment of the present invention.

FIG. 16 shows an example of D2D mobility from an M-UE to a target eNB in a UE autonomous mode according to an embodiment of the present invention.

1. The M-UE may configure measurement on neighboring cells or neighboring D2D UEs via a D2D connection reconfiguration message. Based on the D2D measurement configuration, the S-UE performs measurement on neighboring cells and then may report measurement results including quality of received signals from neighboring cells or neighboring D2D UEs via a D2D measurement report message.

2. For D2D connection in the UE autonomous mode, the M-UE may make decision on handover of the S-UE to the target eNB, e.g. based on the measurement report. If the M-UE makes handover decision, the M-UE transmits a D2D handover request message to the serving eNB.

The D2D handover request message includes a target cell ID, a D2D configuration used for the D2D connection between the M-UE and the S-UE, and an S-UE identity, e.g. S-CRNTI1. That is, a D2D related message including an identity of the S-UE is transmitted from the M-UE to the serving eNB, as shown in FIG. 10.

3. For handover, the serving eNB transmits a handover required message including the D2D configuration and the S-CRNTI1 to the MME. Then the MME transmits a handover request to the target eNB. If the target eNB accepts the handover request, the target eNB transmits a handover command message to the serving eNB via the MME. The handover command message includes mobility control information, an S-UE identity for the D2D connection (S-CRNTI1) and an S-UE identity allocated by the target eNB (S-CRNTI2).

The handover command message is transported to the S-UE via the serving eNB and the M-UE. The M-UE receives the handover command message from the serving eNB, and transmits a D2D connection reconfiguration message to the S-UE. That is, a D2D related message including an identity of the S-UE is transmitted from the serving eNB to the M-UE, as shown in FIG. 11.

4. After receiving the handover command message, the S-UE transmits an RRC connection reconfiguration complete (or handover complete) message to the target eNB. The handover complete message includes the S-CRNTI2, a D2D mobility indication, and a NAS initial UE message. The D2D mobility indication informs the target eNB that this handover corresponds to D2D handover. The NAS Initial UE message such as a service request is transported to the MME. Afterwards, the target eNB performs security activation via a security mode command procedure and sets up DRBs.

Figure 17:
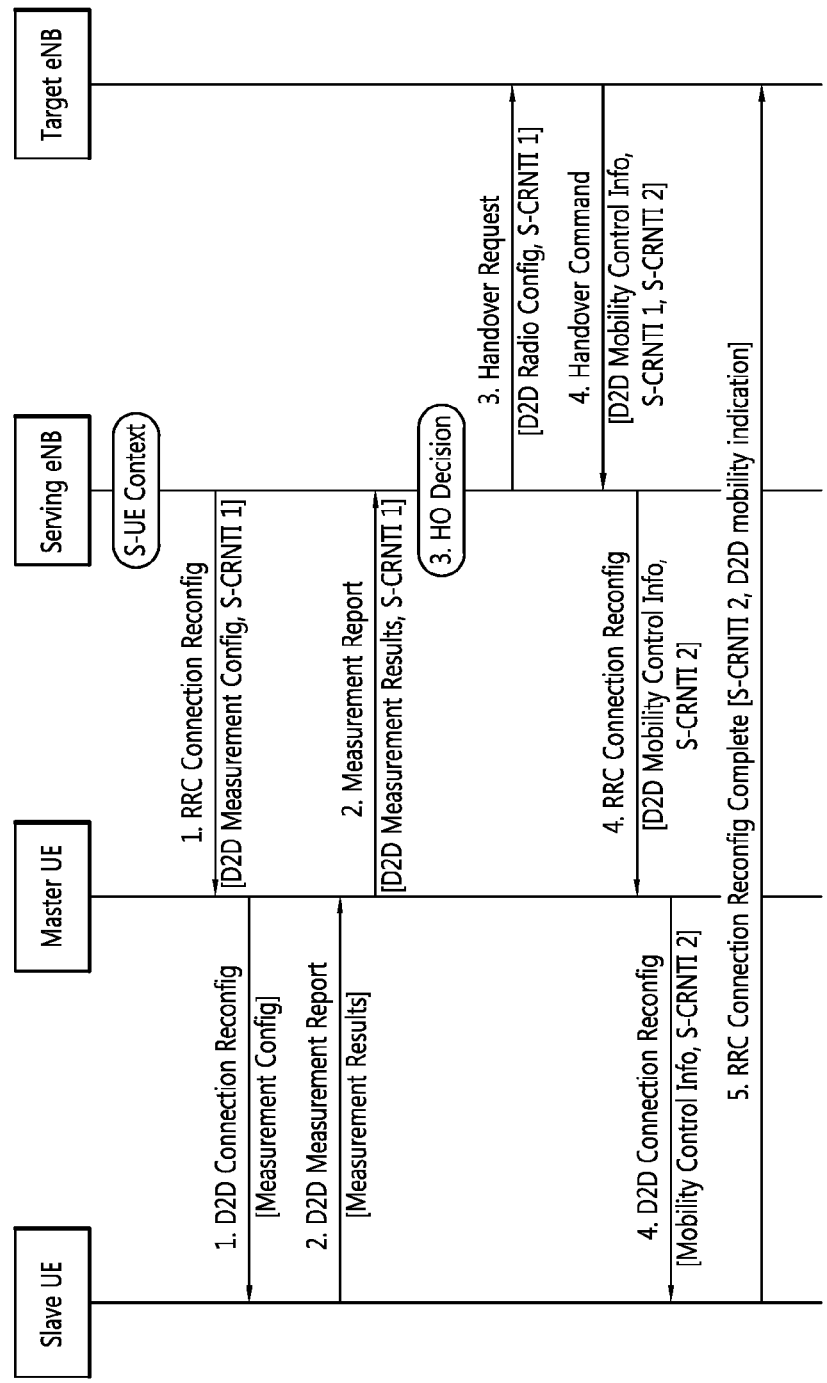
FIG. 17 shows an example of D2D mobility from an M-UE to a target eNB in an E-UTRAN planned mode according to an embodiment of the present invention.

FIG. 17 shows an example of D2D mobility from an M-UE to a target eNB in an E-UTRAN planned mode according to an embodiment of the present invention.

1. The serving eNB may configure a D2D measurement on neighboring cells or neighboring D2D UEs via an RRC connection reconfiguration message transmitted to the M-UE. The D2D measurement configuration is transferred from the M-UE to the S-UE.

In addition, the RRC connection reconfiguration message may include an S-CRNTI1. That is, a D2D related message including an identity of the S-UE is transmitted from the serving eNB to the M-UE, as shown in FIG. 11.

2. Based on the D2D measurement configuration, the S-UE performs measurement on neighboring cells and then may report measurement results including quality of received signals from neighboring cells or neighboring D2D UEs via a D2D measurement report message transmitted to the M-UE. The D2D measurement report message is transported from the M-UE to the serving eNB.

In addition, the D2D measurement report message may include the S-CRNTI1. That is, a D2D related message including an identity of the S-UE is transmitted from the M-UE to the serving eNB, as shown in FIG. 10.

3. For D2D connection in the E-UTRAN planned mode, the serving eNB may make decision on handover of the S-UE to the target eNB, e.g. based on the measurement report. If the serving eNB makes handover decision, the serving eNB transmits a D2D handover request message to the target eNB. The D2D handover request message includes a target cell ID, a D2D radio configuration used for the D2D connection between the M-UE and the S-UE, and an S-UE identity, e.g. S-CRNTI1.

4. If the target eNB accepts the handover request, the target eNB transmits a handover command message to the serving eNB. The handover command message includes mobility control information, an S-UE identity for the D2D connection (S-CRNTI1) and an S-UE identity allocated by the target eNB (S-CRNTI2).

The handover command message is transported to the S-UE via the serving eNB and the M-UE. The serving eNB transmits an RRC connection reconfiguration message to the M-UE, and the M-UE transmits a D2D connection reconfiguration message to the S-UE. That is, a D2D related message including an identity of the S-UE is transmitted from the serving eNB to the M-UE, as shown in FIG. 11.

5. After receiving the D2D connection reconfiguration message, the S-UE transmits an RRC connection reconfiguration complete (or handover complete) message to the target eNB. The handover complete message includes the S-CRNTI2, and a D2D mobility indication. The D2D mobility indication informs the target eNB that this handover corresponds to D2D handover.

Figure 18:
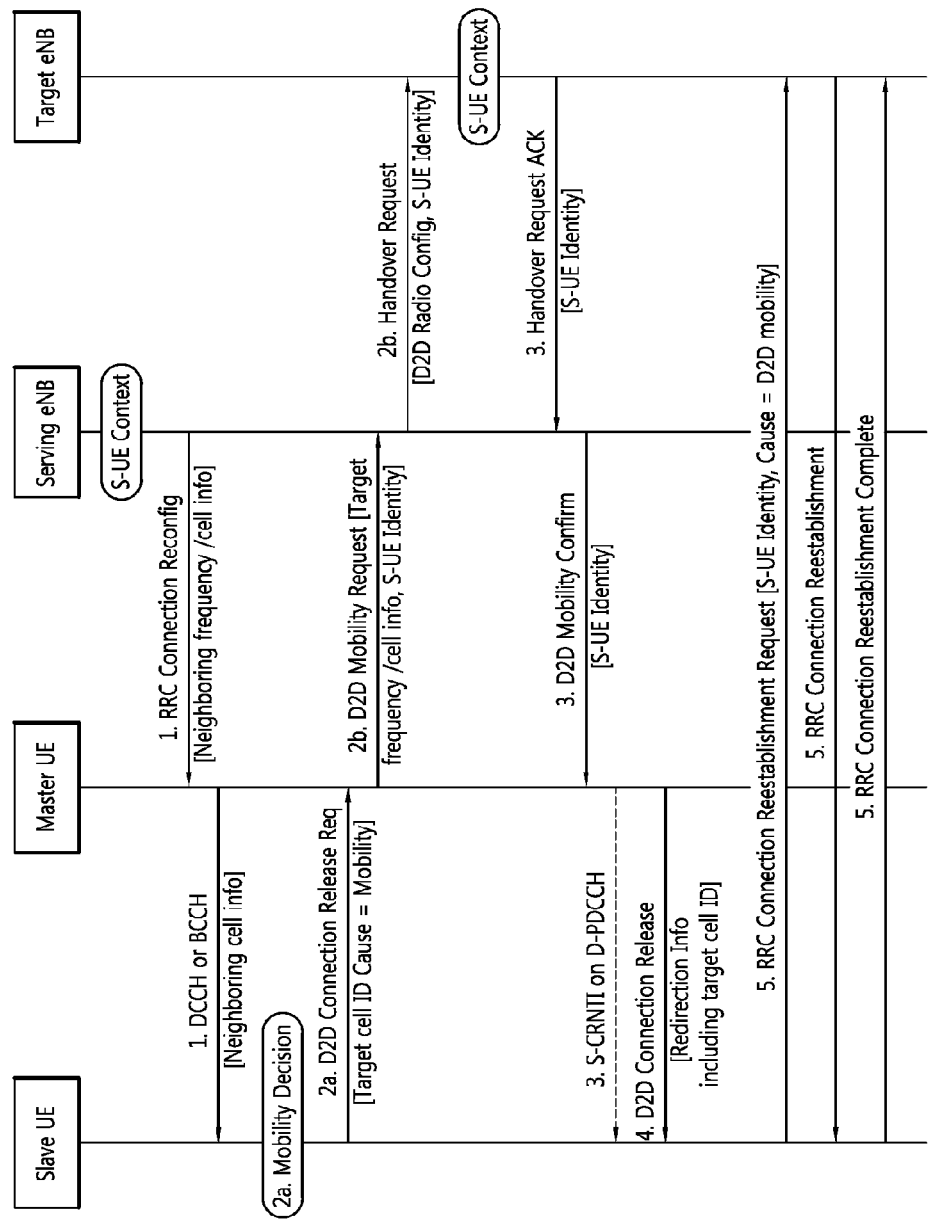
FIG. 18 shows another example of D2D mobility from an M-UE to a target eNB in an E-UTRAN planned mode according to an embodiment of the present invention.

FIG. 18 shows another example of D2D mobility from an M-UE to a target eNB in an E-UTRAN planned mode according to an embodiment of the present invention.

1. The serving eNB may inform the M-UE of neighboring cell information, such as carrier frequencies and cell identities of neighboring cells. The M-UE may share this neighboring cell information with one or more S-UEs via a BCCH or a DCCH. UEs may use this information to make connections with eNBs.

2a. If the S-UE finds a suitable cell and should establish an RRC connection, rather than D2D connection, the S-UE may transmits a D2D connection release request message to the M-UE for D2D connection. The D2D connection release request message includes information on target frequency/cell and release cause set to 'mobility'.

2b. For D2D connection in the E-UTRAN planned mode, upon reception of the D2D connection release request message, the M-UE transmits a D2D mobility request message including the target frequency/cell information and an S-UE identity to the serving eNB. That is, a D2D related message including an identity of the S-UE is transmitted from the M-UE to the serving eNB, as shown in FIG. 10.

The serving eNB finds the target eNB based on the target frequency/cell information, and then transmits a handover request message to the target eNB. The handover request message includes a D2D radio configuration used for the D2D connection between the M-UE and the S-UE, and the S-UE Identity, e.g. S-CRNTI1.

3. If the target eNB accepts this mobility, the target eNB transmits a handover request acknowledge (ACK) message to the serving eNB, and then the serving eNB transmits a D2D mobility confirm message including the S-UE identity to the M-UE. That is, a D2D related message including an identity of the S-UE is transmitted from the serving eNB to the M-UE, as shown in FIG. 11.

4. After receiving the D2D mobility confirm message from the serving eNB, the M-UE transmits a D2D connection release message to the S-UE. The D2D connection release message may include redirection information indicating redirected carrier frequency or redirected cell. The redirection information may include a target cell ID. The S-UE may perform cell reselection based on the redirection information.

5. If the S-UE selects a cell, the S-UE may transmit an RRC connection reestablishment request message to the target eNB controlling the selected cell. The RRC connection reestablishment request message or the RRC connection reestablishment complete message may include the S-UE identity and a reestablishment cause indicating D2D mobility.

Figure 19:
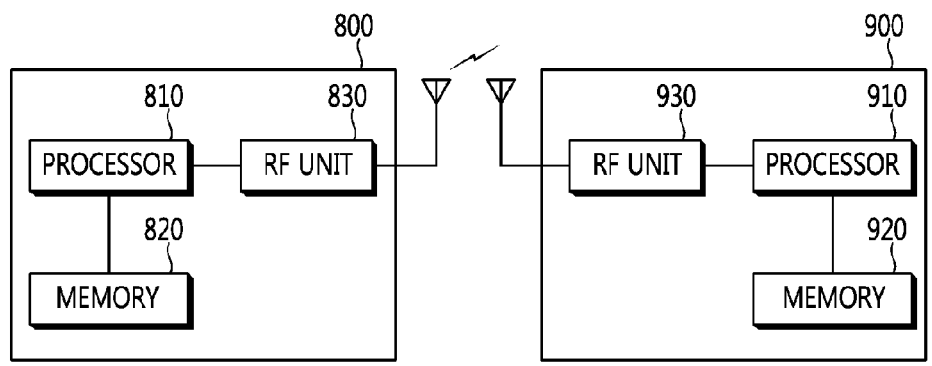
FIG. 19 is a block diagram showing wireless communication system to implement an embodiment of the present invention.

FIG. 19 is a block diagram showing wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for performing, by a first user equipment (UE), a buffer status reporting (BSR) in a wireless communication system, the method comprising:
 receiving a configuration of an evolved-UMTS terrestrial radio access network (E-UTRAN) planned mode in which an eNodeB (eNB) controls radio resources for UE-to-UE transmission from the eNB;
 generating, in the E-UTRAN planned mode, a first type of BSR for uplink transmission from the first UE to the eNB and a second type of BSR for UE-to-UE transmission from the first UE to a second UE; and
 transmitting the first type of BSR and the second type of BSR via a media access control (MAC) protocol data unit (PDU) to the eNB,
 wherein the type of the BSR is indicated by a header of the MAC PDU, and
 wherein a MAC control element (CE) in the MAC PDU includes an indication of the second UE.

2. The method of claim 1, further comprising receiving a third type of BSR for UE-to-UE transmission from the second UE to the first UE, via a MAC PDU from the second UE.

3. The method of claim 1, wherein the UE-to-UE transmission is scheduled by a network.

4. The method of claim 1, wherein the header of the MAC PDU further indicates a cell radio network temporary identity (C-RNTI) allocated for the second UE.

5. The method of claim 1, further comprising receiving a grant of resources for the UE-to-UE transmission from the eNB.

6. The method of claim 5, further comprising receiving an indication of a C-RNTI allocated for the first UE.

7. The method of claim 5, further comprising performing the UE-to-UE transmission to the second UE by using the received grant of the resources for the UE-to-UE transmission.

8. A first user equipment (UE) configured to perform a buffer status reporting (B SR) in a wireless communication system, the first UE comprising:
   a radio frequency (RF) unit configured to transmit or receive a radio signal; and
   a processor coupled to the RF unit, and configured to:
      receive a configuration of an evolved-UMTS terrestrial radio access network (E-UTRAN) planned mode in which an eNodeB (eNB) controls radio resources for UE-to-UE transmission;
      generate, in the E-UTRAN planned mode, a first type of BSR for uplink transmission from the first UE to the eNB and a second type of BSR for UE-to-UE transmission from the first UE to a second UE; and
      transmit the first type of BSR and the second type of BSR via a media access control (MAC) protocol data unit (PDU) to the eNB,
   wherein the type of the BSR is indicated by a header of the MAC PDU, and
   wherein a MAC control element (CE) in the MAC PDU includes an indication of the second UE.

9. The first UE of claim 8, wherein the processor is further configured to receive a third type of BSR for UE-to-UE transmission from the second UE to the first UE, via a MAC PDU from the second UE.

10. The first UE of claim 8, wherein the UE-to-UE transmission is scheduled by a network.

11. The first UE of claim 8, wherein the header of the MAC PDU further indicates a cell radio network temporary identity (C-RNTI) allocated for the second UE.

12. The first UE of claim 8, wherein the processor is further configured to receive a grant of resources for the UE-to-UE transmission from the eNB.

13. The first UE of claim 12, wherein the processor is further configure to receive an indication of a C-RNTI allocated for the first UE.

14. The first UE of claim 12, wherein the processor is further configured to perform the UE-to-UE transmission to the second UE by using the received grant of the resources for the UE-to-UE transmission.

* * * * *